(12) United States Patent
Ishizaki et al.

(10) Patent No.: US 9,024,900 B2
(45) Date of Patent: May 5, 2015

(54) ELECTRONIC DEVICE AND METHOD OF CONTROLLING SAME

(75) Inventors: Shinya Ishizaki, Kanagawa (JP); Takafumi Oka, Kanagawa (JP); Shuji Ishikawa, Kanagawa (JP); Ayano Nakamura, Kanagawa (JP); Masashi Nakazawa, Kanagawa (JP)

(73) Assignee: Kyocera Corporation, Kyoto (JP)

(*) Notice: Subject to any disclaimer, the term of this patent is extended or adjusted under 35 U.S.C. 154(b) by 208 days.

(21) Appl. No.: 13/809,193

(22) PCT Filed: Jul. 12, 2011

(86) PCT No.: PCT/JP2011/065836
§ 371 (c)(1),
(2), (4) Date: Jan. 9, 2013

(87) PCT Pub. No.: WO2012/008425
PCT Pub. Date: Jan. 19, 2012

(65) Prior Publication Data
US 2013/0113748 A1   May 9, 2013

(30) Foreign Application Priority Data

Jul. 13, 2010 (JP) ................................ 2010-158464
Jul. 14, 2010 (JP) ................................ 2010-159347

(51) Int. Cl.
G06F 3/041 (2006.01)
G06F 3/0483 (2013.01)
G06F 3/0488 (2013.01)

(52) U.S. Cl.
CPC ............ *G06F 3/0416* (2013.01); *G06F 3/0483* (2013.01); *G06F 3/0488* (2013.01); *G06F 2203/04808* (2013.01)

(58) Field of Classification Search
CPC ... G06G 3/0416; G06F 3/0482; G06F 3/0488; G06F 2203/04808
USPC ................................................... 345/173–179
See application file for complete search history.

(56) References Cited

U.S. PATENT DOCUMENTS

| | | | |
|---|---|---|---|
| 2006/0114239 A1 | 6/2006 | Nakajima | |
| 2009/0195515 A1* | 8/2009 | Lee | 345/173 |
| 2009/0256808 A1* | 10/2009 | Kun et al. | 345/173 |
| 2011/0289406 A1* | 11/2011 | Wassingbo | 715/256 |

FOREIGN PATENT DOCUMENTS

| | | |
|---|---|---|
| JP | 9018566 A | 1/1997 |
| JP | 9204540 A | 8/1997 |
| JP | 10-049289 | 2/1998 |

(Continued)

OTHER PUBLICATIONS

Notice of Reasons for Rejection issued to JP Application No. 2012-524548, mailed Apr. 22, 2014.

*Primary Examiner* — Premal Patel
(74) *Attorney, Agent, or Firm* — Hoffmann & Baron, LLP

(57) ABSTRACT

Provided are an electronic device wherein an application can be started up easily using text and so forth displayed in a display unit, and a method of controlling same. A start-up unit uses inputted text to start up an application which executes various functions. If text being displayed on the display unit has been selected as a result of a detection unit detecting that contact has been made to a region in which any of the text characters of the same text is displayed, an application control unit causes the display unit to display an application start-up display to which an application is associated.

13 Claims, 15 Drawing Sheets

(56) References Cited

FOREIGN PATENT DOCUMENTS

| JP | 10301869 A | 11/1998 |
| JP | 2006155424 A | 6/2006 |
| JP | 2007200243 A | 8/2007 |

* cited by examiner

ELECTRONIC DEVICE AND METHOD OF CONTROLLING SAME

CROSS-REFERENCE TO RELATED APPLICATIONS

This application is a National Stage application of International Application No. PCT/JP2011/065836, filed Jul. 12, 2011, which claims benefit to Japanese Application No. 2010-158464, filed Jul. 13, 2010 and Japanese Application No. 2010-159347, filed Jul. 14, 2012, each of which are incorporated by reference herein in their entirety.

FIELD

The present invention relates to an electronic device including a touch panel, and a control method thereof.

BACKGROUND

Conventionally, electronic devices having a display unit and an operation unit input text assigned to the operation unit and display the text on the display unit when an operation unit is operated while a standby screen is displayed on the display unit. Then, when the user selects a desired application in a state where text is input, the electronic device starts the selected application with the input text input in the electronic device (for example, refer to Patent Document 1).

Meanwhile, an electronic device is proposed which performs starting of a desired application and input of text by contact to a touch panel (for example, refer to Patent Document 2).

Patent Document 1: Japanese Unexamined Patent Application, Publication No. 2007-200243
Patent Document 2: Japanese Unexamined Patent Application, Publication No. H09-018566

SUMMARY

Problems to be Solved by the Invention

However, in the electronic devices described in Patent Documents 1 and 2, there are cases where operations are troublesome when a desired application is selected.

An object of the present invention is to provide an electronic device that can select a desired application more easily, and a control method thereof.

Means for Solving the Problems

In order to solve the above-described problems, an electronic device according to the present invention comprises: a display unit; a detecting unit which detects contact to the display unit; a starting unit which starts an application; a control unit which, in a state where text is displayed on the display unit, displays on the display unit an application starting display associated with an application, in a case where text is selected by the detecting unit detecting contact to a region where the text is displayed.

In addition, it is preferable if, when the application starting display is selected, in a state where the application starting display is displayed on the display unit, the control unit causes the starting unit to start an application associated with the selected application starting display and the selected text to be input into a text input region of the application.

In addition, it is preferable if the control unit displays on the display unit a plurality of application starting displays associated with a plurality of applications, and causes the starting unit to start an application associated with an application starting display selected from among the plurality of application starting displays starts.

In addition, it is preferable if, in a state where an image is displayed on the display unit, in a case where the image is selected by the detecting unit detecting contact to a region where the image is displayed, the control unit displays on the display unit the application starting display associated with an application.

In addition, it is preferable if, in a state where the application starting display is displayed on the display unit, when the application starting display is selected, the control unit starts an application associated with the selected application starting display and inserts the selected image into an image insertion region of the application.

In addition, it is preferable if the control unit displays the application starting display on the display unit in a case where contact to the region where the text or the image is continuously displayed for more than or equal to predetermined time is detected by the detecting unit.

In addition, it is preferable if the control unit displays on the display unit an application starting display that is different depending on the selected text or image.

In addition, it is preferable if, in a state where text is displayed on the display unit, in a case where text is selected by the detecting unit detecting contact to a region where the text is displayed, the control unit displays on the display unit an icon associated with the application as the application starting display, and in a case, where contact to a region where the icon is displayed, is detected by the detecting unit, causes the starting unit to start an application associated with an icon on which the contact is detected and inputs the selected text into a text input region of the application.

In addition, it is preferable if, in a state where an image is displayed on the display unit, in a case where an image is selected by the detecting unit detecting contact to a region where an image is displayed, the control unit causes the starting unit to start an application associated with an icon on which the contact is detected, and inserts the selected text into an image insertion region of the application.

In addition, it is preferable if, when detection by the detecting unit of contact to the region where an icon is displayed is determined, the control unit starts an application associated with the icon on which the contact is detected.

In addition, it is preferable if the electronic device further comprises handwritten text input unit which inputs handwritten text by contact to the display unit, and wherein the text displayed on the display unit is text that is input by the handwritten text input unit.

In addition, it is preferable if the electronic device further comprises a region specification unit which specifies a region for inputting the handwritten text on the display unit by contact to the display unit, and wherein the handwritten text input unit inputs handwritten text inside the region specified by the region specification unit.

In addition, it is preferable if, in a case where the started application is ended, the control unit displays on the display unit text displayed immediately before the detecting unit detects contact to the region where the text is displayed In order to solve the above-described problems, a method for controlling an electronic device according to the present invention comprises: a step of displaying text on a display unit; a step of selecting text by the detecting unit detecting contact to the display unit; and a step of displaying on the display unit an application starting display which is used for starting an application by a starting unit in response to the text being selected.

Effects of the Invention

The present invention aims to provide an electronic device and a control method that can select a desired application more easily.

DETAILED DESCRIPTION

Figure 1:
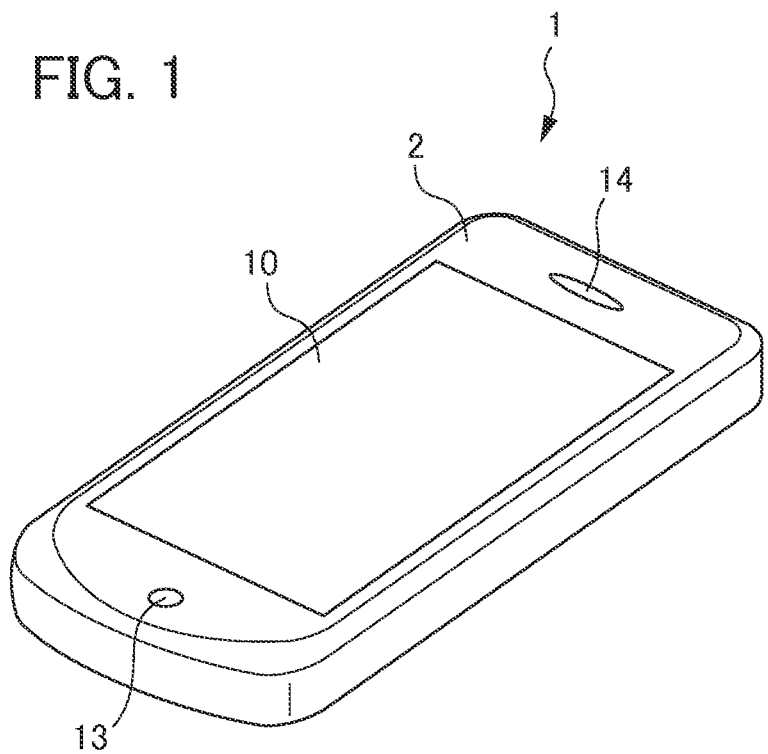
FIG. 1 is an external perspective view of a cellular telephone device according to an embodiment.

Descriptions are provided hereinafter regarding embodiments of the present invention. First of all, with reference to FIG. 1, descriptions are provided for a basic structure of a cellular telephone device 1 according to an embodiment of the portable electronic device of the present invention. FIG. 1 is a perspective view showing an appearance of the cellular telephone device 1 according to the present embodiment.

The cellular telephone device 1 includes a body 2. A touch panel 10, a microphone 13 and a speaker 14 are disposed on a front face portion of the body 2.

Figure 2:
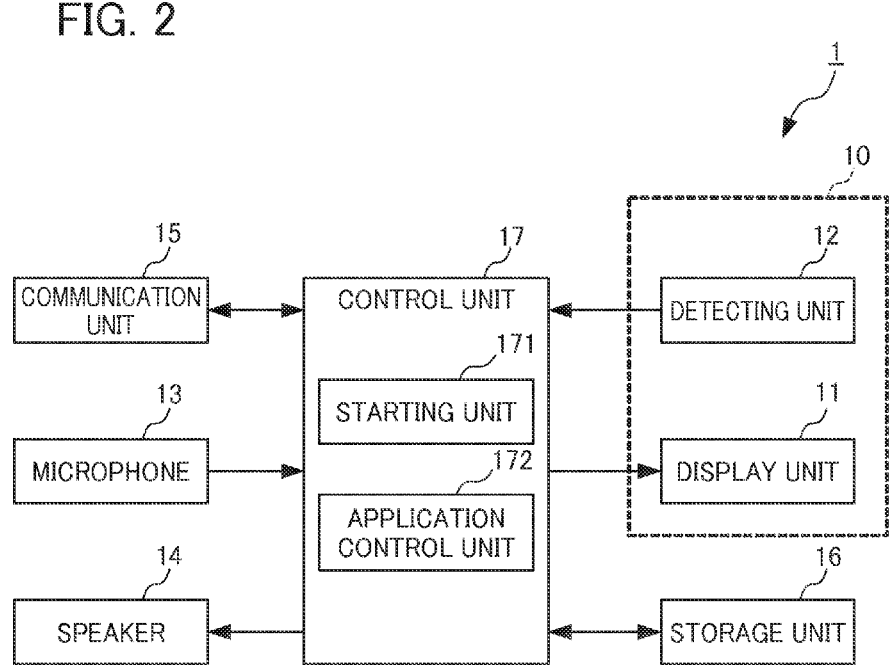
FIG. 2 is a functional block diagram showing the function of the cellular telephone device according to a first embodiment.

The touch panel 10 includes a display unit 11 and a detecting unit 12 (see FIG. 2). The display unit 11 is a liquid-crystal display panel, an organic EL (electroluminescence) display panel, or the like, and displays text and images. The detecting unit 12 is a sensor that detects a touch by an object, such as a finger or stylus of a user of the cellular telephone device 1, on the display unit 11. For example, a sensor that employs a capacitive sensing method or a resistive film method can be utilized as the detecting unit 12. The microphone 13 is used for inputting sound produced by the user of the cellular telephone device 1 during a telephone call. The speaker 14 is used for outputting sound produced by the other party whom the user of the cellular telephone device 1 is talking with during a phone call.

First Embodiment

Functional arrangements of the cellular telephone device 1 according to the first embodiment of the electronic device of the present invention will be described with reference to FIG. 2. FIG. 2 is a block diagram showing the functional arrangement of the cellular telephone device 1.

The cellular telephone device 1 includes the touch panel 10 (the display unit 11 and the detecting unit 12), the microphone 13, and the speaker 14, as described above. In addition, the cellular telephone device 1 includes a communication unit 15, a storage unit 16, and a control unit 17.

The communication unit 15 includes a main antenna (not illustrated) and an RF circuit unit (not illustrated), and makes an outgoing call to and performs communication with a predetermined contact entity. The contact entity, to which the communication unit 15 makes an outgoing call, is an external device that performs a telephone call or mail transmission/reception with the cellular telephone device 1, or an external device or the like such as an external web server, with which the cellular telephone device 1 establishes Internet connections.

The communication unit 15 performs communication with an external device via a predetermined usable frequency band. More specifically, the communication unit 15 executes demodulation processing of a signal received via the main antenna, and transmits the processed signal to the control unit 17. In addition, the communication unit 15 executes modulation processing of a signal transmitted from the control unit 17, and transmits the signal to an external device (base station) via the main antenna.

The storage unit 16 includes, for example, working memory, and is utilized for arithmetic processing by the control unit 17. Furthermore, the storage unit 16 stores a single or plurality of applications or databases that are operated inside the cellular telephone device 1. It should be noted that the storage unit 16 may also serve as detachable external memory.

The control unit 17 controls the entirety of the cellular telephone device 1, and performs control of the display unit 11 and the communication unit 15.

The cellular telephone device 1 according to the first embodiment has a function to start an application using, for example, text and images, displayed on the display unit 11. The arrangement for performing the function will be described hereafter with reference to FIGS. 2-4.

As shown in FIG. 2, the control unit 17 has a starting unit 171 and an application control unit 172. The starting unit 171 starts an application which performs various kinds of functions by using displayed text. Examples of the application include an electronic mail application, a memo pad application, a text editing application, and a browser application (browser application capable of inputting text for searching).

In a state where text is displayed on the display unit 11, when text is selected by contact to a region, where at least one text is displayed, being detected by the detecting unit 12, the application control unit 172 displays on the display unit 11 an application starting display with which an application is associated. Here, text according to the present embodiment may include a number, an alphabetic character, or a symbol, in addition to hiragana text, katakana text, and kanji text. In addition, text includes not only a single character but also a character string.

Figure 3:
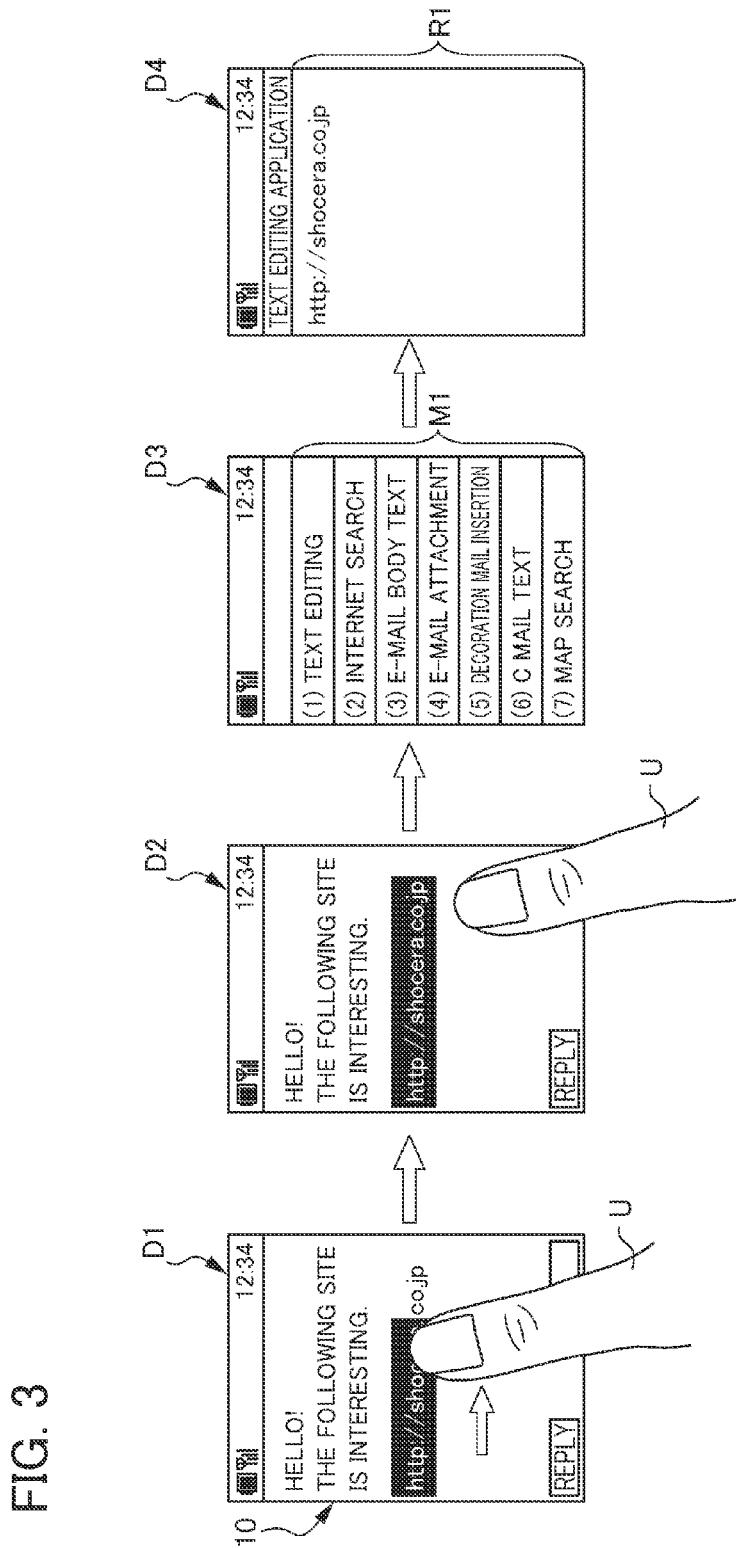
FIG. 3 is a diagram showing an example of the screen transfer displayed on the display unit according to the first embodiment.

Specifically, the control unit 17 performs the following processing. FIG. 3 is a diagram showing an example of the screen transfer displayed on the display unit 11 according to the first embodiment. It should be noted that when contact to a region where text is displayed is detected by the detecting unit 12, the control unit 17 according to the first embodiment specifies text displayed on a position where the contact is detected and selects the specified text. Then, the selected text is displayed as differentiated from other text that is not selected, by, for example, an inverse display.

In Screen D1 of FIG. 3, a browser application has been started and the browser application displays on the display unit 11 the text "Hello! The following site is interesting: http://shocera.co.jp".

In a state where Screen D1 is displayed, the application control unit 172 selects the text "http://shocera.co.jp" by contact being detected by the detecting unit 12 in a region where "http://shocera.co.jp" is displayed among the text displayed on Screen D1. It should be noted that, the text selected in the display unit 11 is inversely displayed.

Then, when the text "http://shocera.co.jp" is continuously selected for more than or equal to a predetermined time by the detecting unit 12 and when the contact is released (the finger of the user moves away) (Screen D2), the application control unit 172 displays on the display unit 11 an application starting menu M1 with which applications are associated (Screen D3).

Here, a plurality of items of the application starting menu M1 for performing functions, such as text editing, Internet search, E-mail body text, E-mail attachment, decoration mail insertion, C mail text, and map search, is displayed in Screen D3.

In Screen D3, when one application starting menu item is selected among the plurality of items of the application starting menu M1 thus displayed, the application control unit 172 makes the starting unit 171 start an application (for example, text editing application) associated with the application starting menu item thus selected (Screen D4).

In addition, as shown in Screen D4, when an application starting menu is selected, the application control unit 172 makes the starting unit 171 start an application associated with the application starting menu thus selected, and inputs the text selected in Screen D2, "http://shocera.co.jp", into the text input region of the application thus started. It should be noted that the application starting menu and the application are associated with each other, and are stored in the storage unit 16. In addition, a text input region is a region (for example, a region in which text can be input in the document preparation screen in a text editing application) in an application where text can be input.

In addition, when the started application is ended (when a state where the started application is running ends), the application control unit 172 makes a browser application display on the display unit 11 a web page including text that has been displayed immediately before when contact to the region where the text, "http://shocera.co.jp" is displayed is detected by the detecting unit 12. That is, a web page including the text that has been displayed in Screen D1 or D2, "Hello! The following site is interesting. http://shocera.co.jp" is displayed on the display unit 11.

Thus, according to the first embodiment, in a state where text is displayed on the display unit 11, when text is selected by contact to a region, where at least a part of the displayed text is displayed, being detected by the detecting unit 12, the cellular telephone device 1 displays on the display unit 11 an application starting display with which an application is associated.

Thereby, since the cellular telephone device 1 displays the application starting menu M with which an application is associated when the text displayed on the display unit 11 is selected, it is possible to start an application simply by using the text displayed on the display unit 11.

In addition, according to the first embodiment, when text is continuously selected for more than or equal to a predetermined time by the detecting unit 12 and the contact is discontinued, the cellular telephone device 1 displays on the display unit 11 the application starting menu M1 with which an application is associated. Thereby, the cellular telephone device 1 can perform a function for displaying the application starting menu M1 differentiated from other functions (for example, a link to a URL, or a simple copy) that executes by selecting text.

In addition, according to the first embodiment, when the application starting menu is selected, the cellular telephone device 1 starts, by the starting unit 171, text input application associated with the application starting menu item thus selected, and inputs the selected text input into the application. Thereby, since the cellular telephone device 1 inputs the selected text into the started application, it is possible to improve usability of the started application. It should be noted that "the cellular telephone device 1 starts, by the starting unit 171, a text input application associated with the application starting menu item thus selected, and inputs the selected text input into the application" may be done by inputting the selected text into the started application and saving it as a draft. In addition, the screen of the application may be displayed after inputting the selected text into the started application.

In addition, according to the first embodiment, when the started state of the started application is ended, the cellular telephone device 1 displays on the display unit 11 text that has been displayed immediately before, when contact to the region, where text is displayed, is detected by the detecting unit 12. Thereby, since the text displayed immediately before the contact is detected, is displayed also after the started state of the application is ended, the cellular telephone device 1 can improve the usability for the user.

In addition, according to the first embodiment, the cellular telephone device 1 displays on the display unit 11 a plurality of items of the application starting menu M1 associated with a plurality of applications, respectively, and starts, by the starting unit 171, an application associated which the selected item among the plurality of items of the application starting menu M1.

Thereby, since the cellular telephone device 1 can start a desired application from the plurality of items of the application starting menu M1, it is possible to further improve the usability for the user with respect to the application.

It should be noted that although the application control unit 172 displays the plurality of items of the application starting menu M1 on Screen D3 in FIG. 3, the control unit 172 may be done so as to display one item of the application starting menu, and then, when the application starting menu is selected, display the plurality of items of the application starting menu M1.

Figure 4:
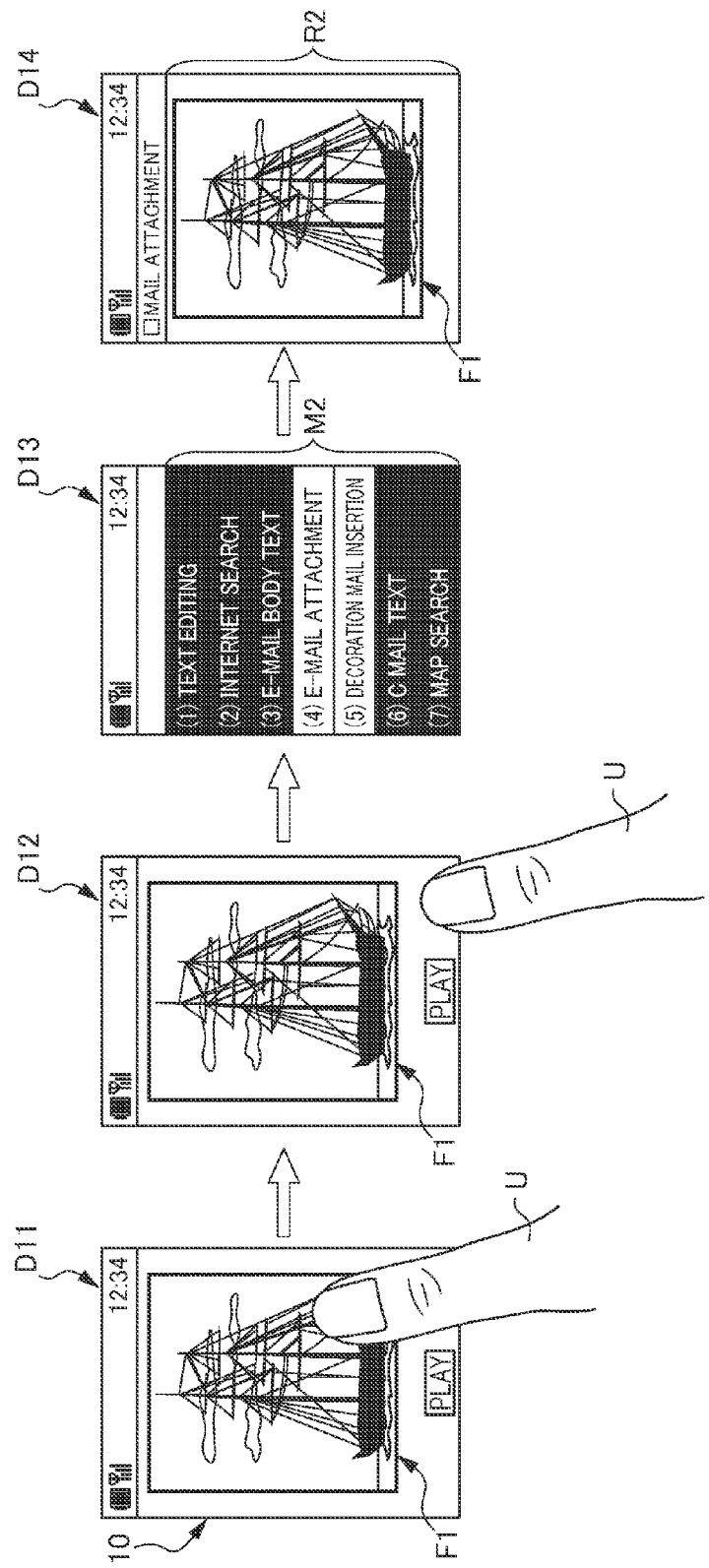
FIG. 4 is a diagram showing other examples of the screen transfer displayed on the display unit according to the first embodiment.

Next, processing in a case where an application starts using an image displayed on the display unit 11 will be described with reference to FIG. 4. FIG. 4 is a diagram showing an example of the screen transfer displayed on the display unit 11 according to the first embodiment. In Screen D11 of FIG. 4, a browser application has been started and an image F1 is displayed on the display unit 11 by the browser application.

In a state where Screen D11 is displayed, the application control unit 172 selects the image F1 by detecting, by the detecting unit 12, contact to a region where the image F1 displayed on Screen D11 is displayed.

Subsequently, when the image F1 is continuously selected for more than or equal to a predetermined time and the contact is released (the finger of the user moves away) as detected by the detecting unit 12 (Screen D12), the application control unit 172 displays on the display unit 11 an application starting menu M2 with which applications to be started are associated (Screen D13).

Here, in the application starting menu M2, functions of TEXT EDITING, INTERNET SEARCH, E-MAIL BODY TEXT, C MAIL TEXT, and MAP SEARCH are displayed as being grayed out and cannot be executed, and only functions of E-MAIL ATTACHMENT and DECORATION MAIL INSERTION are executable. That is, the application control unit 172 displays on the display unit 11 the application starting menu M2 in a state where only an application that can use the selected image F1 is executable.

In Screen D13, when one item is selected among the displayed plurality of items of application starting menu M2, the application control unit 172 starts, by the starting unit 171, the application associated with the application starting menu thus selected and inserts into an image insertion region of the application thus started, the image F1 selected in Screen D12 as an attachment file (Screen D14). An image insertion region is a region where an image in the application can be inserted (for example, a region where an image in an electronic mail application can be attached, and a region where an image in a mail creation screen in an electronic mail application can be inserted).

In addition, when the started application is ended, that is, when a state in which the started application is executed ends, the application control unit 172 displays on the display unit 11, by a browser application, a web page including the image F1 that has been displayed immediately before the contact is detected by the detecting unit 12.

As described above, the application control unit 172 displays on the display unit 11 an application starting menu M1 or M2 depending on the selected text or image (refer to Screen D3 of FIG. 3 and Screen D13 of FIG. 4). Thereby, since the cellular telephone device 1 displays the application starting menu according to the selected text or image, it is possible to further improve the usability for the user with respect to the application.

In addition, although the application control unit 172 inserts only the selected image F1 into the image insertion region of the started application in the example of the screen transfer in FIG. 4, the text stored in correspondence with the selected image F1 (for example, text data included in a JPEG image) may be input into the text input region of the started application together with the selected image F1. In this case, the text corresponding to the selected image F1 may be input into an application as text data and may be inserted in the image insertion region of an application as an attachment file.

Figure 5:
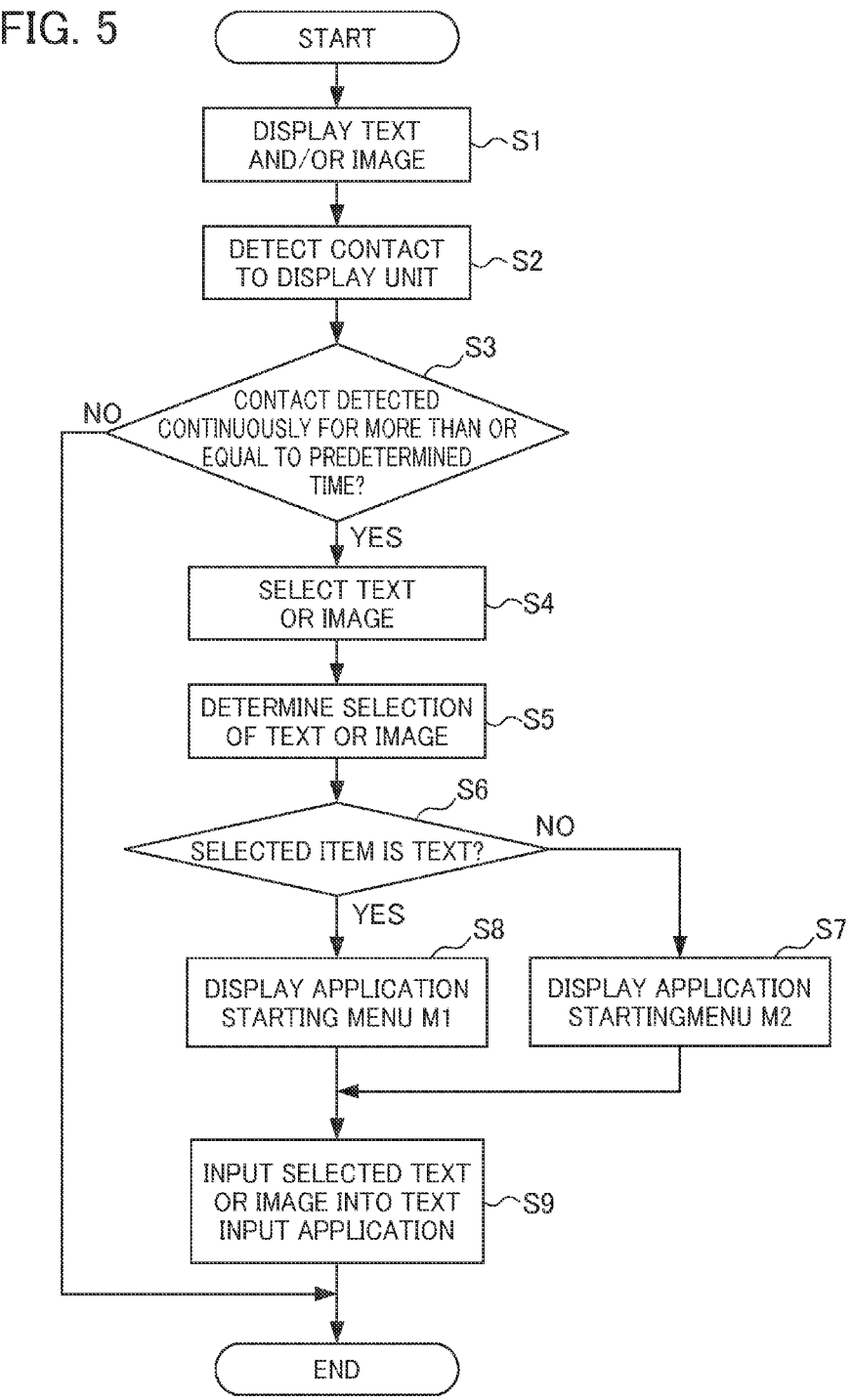
FIG. 5 is a flow chart showing processing of the cellular telephone device according to the first embodiment.

Next, processing of the cellular telephone device 1 according to the first embodiment will be described. FIG. 5 is a flow chart showing processing of the cellular telephone device 1 according to the first embodiment. In Step S1, the control unit 17 displays text or an image on the display unit 11.

In Step S2, the control unit 17 detects contact to the display unit 11 by the detecting unit 12. In Step S3, the control unit 17 determines whether or not the contact to the display unit 11 is continuously detected by the detecting unit 12 for more than or equal to a predetermined time. When the contact is continuously detected for more than or equal to a predetermined time (YES), the process proceeds to Step S4. When the contact is not continuously detected for more than or equal to a predetermined time (NO), the process ends.

In Step S4, the control unit 17 selects text or an image corresponding to the contacted part as a result of continuously detecting contact to the display unit 11 by the detecting unit 12 for more than or equal to a predetermined time. In Step S5, as a result of the contact to the display unit 11 being released, the control unit 17 determines the selection of the text or the image.

In Step S6, the application control unit 172 determines whether or not the selected item is text. When the selected item is text (YES), the process proceeds to Step S8. When the selected item is an image (NO), the process proceeds to Step S7.

In Step S7, the application control unit 172 displays grayed out functions that cannot use an image as an item of the application starting menu M2, and displays only functions that can use an image as an item of the application starting menu M2 (Screen D13 in FIG. 4).

In Step S8, the application control unit 172 displays on the display unit 11 the application starting menu M1 with which applications are associated (Screen D3 in FIG. 3).

In Step S9, when the application starting menu is selected, the application control unit 172 starts, by the starting unit 171, an application associated with the application starting menu thus selected, and inputs the selected text or image into the started application.

As described above, since the application starting menu M1 (M2) associated with an application is displayed when the text or image displayed on the display unit 11 is selected, the cellular telephone device 1 according to the first embodiment can simply start an application by using the text or image displayed on the display unit 11. It should be noted that in the first embodiment the text displayed on the display unit 11 may include not only the text that is input by a handwritten text input unit, which will be described later, but also all of, for example, text that is input by using a virtual keyboard displayed on the display unit 11, and text that is displayed in advance in a browser application or the like.

Second Embodiment

Next, a second embodiment according to the electronic device of the present invention will be described. With respect to the second embodiment, features that differ from the first embodiment will mainly be described, similar components are assigned the same reference numerals as the first embodiment and descriptions thereof are omitted. With respect to the features not described in particular for the second embodiment, descriptions as in the first embodiment apply as appropriate.

Figure 6:
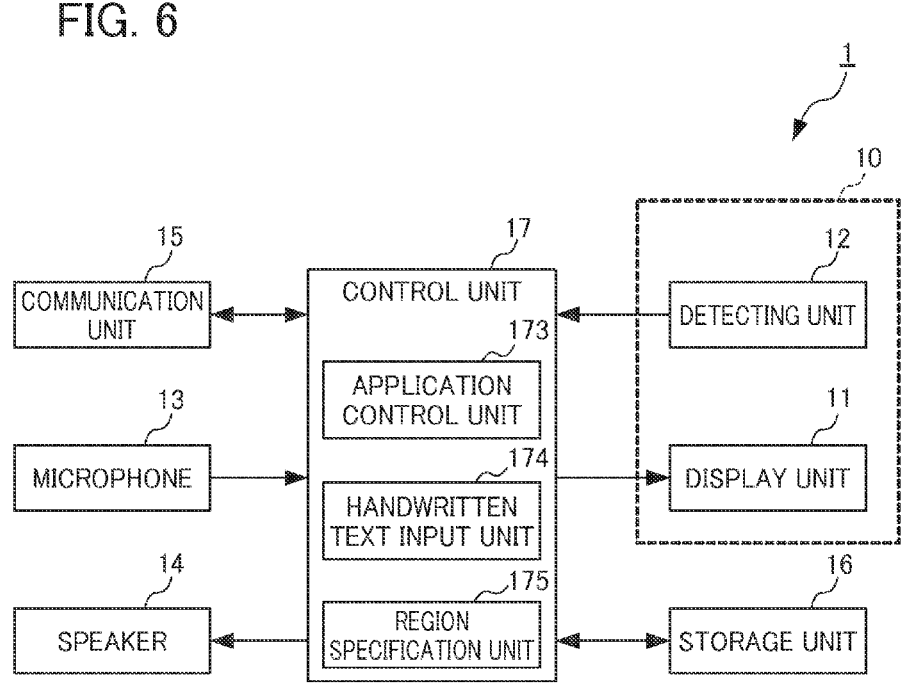
FIG. 6 is a functional block diagram showing the function of the cellular telephone device according to a second embodiment.

Next, a functional arrangement of the cellular telephone device 1 according to the second embodiment will be described with reference to FIG. 6. FIG. 6 is a block diagram showing the functional arrangement of the cellular telephone device 1 according to the second embodiment.

The cellular telephone device 1 has a touch panel 10 (a display unit 11 and a detecting unit 12), a microphone 13, and a speaker 14, which will be described later. In addition, the cellular telephone device 1 has a communication unit 15, a storage unit 16, and a control unit 17.

The cellular telephone device 1 according to the second embodiment has a function to start an application using, for example, text and an icon, which are displayed on the display unit 11. Hereafter, the arrangement for performing the function will be described.

As shown in FIG. 6, the control unit 17 includes an application control unit 173, a handwritten text input unit 174, and a region specification unit 175. In a state where text is displayed on the display unit 11, when contact to an icon (for example, icons 19a-19f, which will be described later) displayed on the display unit 11 is detected by the detecting unit 12, after contact to a region where at least a part of the text is displayed, is detected by the detecting unit 12, causing text to be selected, the application control unit 173 starts an application associated with the icon on which the contact is detected, and inputs the selected text. Here, text according to the second embodiment may include not only hiragana text, katakana text, and kanji text but also a number, an alphabetic character, and a symbol. In addition, text may include not only a single character but also a character string.

The handwritten text input unit 174 inputs a handwritten text into the display unit 11 by contact to the display unit 11. Specifically, the handwritten text input unit 174 detects by the detecting unit 12 a trajectory drawn with a touch pen 18. The handwritten text input unit 174 performs pattern matching between the detected trajectory and the text stored in the handwritten text recognizing database by, for example, a handwritten text recognizing application, and converts the text with the highest recognition rate into text data. Here, the handwritten text recognizing database is stored in the storage unit 16 and has a variety of information for recognizing the handwritten text. In addition, the handwritten text recognizing application is stored in the storage unit 16 and includes an algorithm for recognizing the handwritten text.

The region specification unit 175 specifies a region for inputting the handwritten text into the display unit 11, by contact to the display unit 11. Specifically, the region specification unit 175 detects, by the detecting unit 12, the trajectory drawn on the display unit 11 using the touch pen 18. The region specification unit 175 specifies the region surrounded by the detected trajectory as a region capable of inputting a handwritten text by the handwritten text recognizing application. It should be noted that, the region specification unit 175 does not specify the region for inputting the handwritten text in a case where the trajectory drawn on the display unit 11 using the touch pen 18 does not surround a specific region.

In addition, one application and an icon for starting the application are associated with each other and are stored in the storage unit 16. Examples of the application include an electronic mail application, a memo pad application, a text editing application, and a browser application (for example, a browser application enabled to input text for searching).

Figure 7:
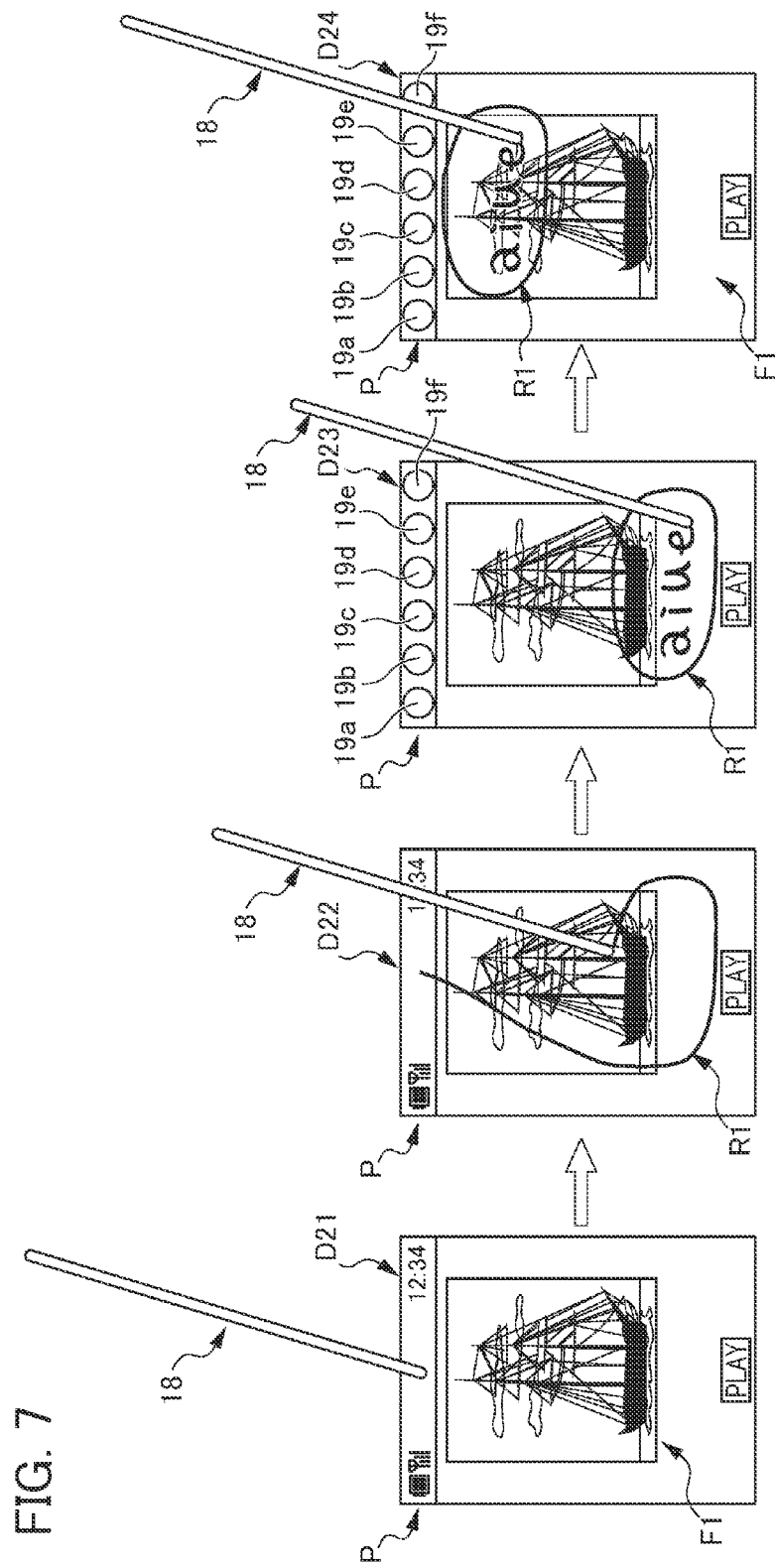
FIG. 7 is a diagram showing an example of the screen transfer displayed on the display unit according to the second embodiment.

FIG. 7 is a diagram showing an example of the screen transfer displayed on the display unit 11 according to the second embodiment. In Screen D21 of FIG. 7, a browser application has been started and an image F1 is displayed on the display unit 11.

In Screen D21 of FIG. 7, when contact to the pictogram region P using the touch pen 18 is detected by the detecting unit 12 (Screen D21), the region specification unit 175 starts a handwritten text recognizing application and detects, by the detecting unit 12, a trajectory drawn on the display unit 11 using the touch pen 18 (Screen D22). The region specification unit 175 specifies, by the handwritten text recognizing application, a region surrounded by the detected trajectory as the region R1 enabled for inputting the handwritten text. In such a case where a base point, where the contact to the display unit 11 using the touch pen 18 is detected, is in the pictogram region P, the region may be specified as a region R1 enabled for inputting the handwritten text by the region specification unit 175. In addition, when the base point, where the contact to the display unit 11 using the touch pen 18 is detected, is on the edge of the display unit 11, the region may be specified as the region R1 enabled for inputting the handwritten text by the region specification unit 175. Thereby, it is possible to avoid conflict with the detection of the contact corresponding to the browser application that has been displayed on Screen D21.

The handwritten text input unit 174 detects by the detecting unit 12 the trajectory drawn using the touch pen 18 in the region R1 specified by the region specification unit 175.

It should be noted that even in a case where contact other than in the pictogram region P or the edge of the display unit 11 is detected, the region specification unit 175 may detect, by the detecting unit 12, the region surrounded by the detected trajectory drawn on the display unit 11 using the touch pen 18 by starting the handwritten text recognizing application. In addition, even in a case where the base point, where the contact to the display unit 11 using the touch pen 18 is detected, is in a region other than the pictogram region P or the edge of the display unit 11, the region may be specified as the region R1 enabled for inputting the handwritten text by the region specification unit 175.

In addition, when a trajectory drawn on the display unit 11 using the touch pen 18 surrounds a specific range, that is, when the range of the drawn trajectory is determined, the application control unit 173 displays icons 19a-19f for starting applications on the pictogram region P (Screen D23).

In Screen D23, by detecting with the detecting unit 12 contact to the region R1 where handwritten text "a i u e" is input by the handwritten text input unit 174, the application control unit 173 selects the recognized text "a i u e".

The region R1 specified by the region specification unit 175 is dragged to one of the icons 19a-19f by operating the touch pen 18 under the control of the application control unit 173 (Screen D24). If the detection of contact to one of the icons 19a-19f is determined by the detecting unit 12 (Screen D24) as a result of the detection of the drag using the touch pen 18 being cancelled, the application control unit 173 starts an application (for example, a memo pad application) stored by being associated with one of the icons 19a-19f, and inputs the selected text "a i u e".

It should be noted that "starting an application and inputting the selected text" by the application control unit 173 may include inputting the selected text into the started application and saving as a draft. In addition, the screen of the started application may be displayed after the selected text has been input into the application.

In addition, when the started application is ended (when a state where the started application is executed ends), the application control unit 173 displays on the display unit 11 with the browser application, a web page including the text displayed immediately before when the contact to the text "a i u e" is detected by the detecting unit 12, that is, the text displayed in Screen D23, "a i u e", and the image F1.

Thus, according to the second embodiment, the cellular telephone device 1 can input the selected text into an application by starting the application by an intuitive operation that uses icons (icons 19a-19f) displayed on the display unit 11. In addition, since the cellular telephone device 1 inputs the selected text into the started application, it is possible to improve the usability for the user upon starting the application.

In addition, when the detection of the contact to the icon 19a-19f by the detecting unit 12 is determined (that is, when the detection of the drag using the touch pen 18 is cancelled), the application control unit 173 starts the application stored in a state associated with the icon 19a-19f. Thereby, the cellular telephone device 1 can start an application easily by an intuitive operation.

In addition, when the application is ended, that is, when the state where the started application is executed is ended, the application control unit 173 displays on the display unit 11 the text displayed immediately before the contact to the text is detected by the detecting unit 12. Thereby, since the cellular telephone device 1 displays the text displayed immediately before the contact is detected after the application is ended also, it is possible to improve the usability for the user.

In addition, according to the second embodiment, the text displayed on the display unit 11 is text that is input by the handwritten text input unit 174. Thereby, since the cellular telephone device 1 inputs into the started application the handwritten text that is input by the contact to the display unit 11, it is possible to start an application with a more intuitive and simpler operation. In addition, since the cellular telephone device 1 inputs the handwritten text into the started application, it is possible to improve the usability for the user upon starting the application.

In addition, the handwritten text input unit 174 inputs the handwritten text in a region R1 specified by the region specification unit 175. Thereby, since the cellular telephone device 1 inputs the handwritten text in the specified region R1 into the application, it is possible to input text into an application by a more intuitive operation. It should be noted that, in the second embodiment, the text displayed on the display unit 11 may include not only text that is input by the handwritten text input unit 174 but also all of, for example, text that is input using a virtual keyboard displayed on the display unit 11, and text that is displayed in advance in, for example, a browser application.

It should be noted that, in the second embodiment, although the cellular telephone device 1 displays the icons 19a-19f on the pictogram region P, the present invention is not limited to this, and may display the icons 19a-19f on a region other than the pictogram region P, for example.

Next, processing in the case of starting an application using text displayed on the display unit 11 in the second embodiment will be described with reference to FIGS. 8-12.

Figure 8:
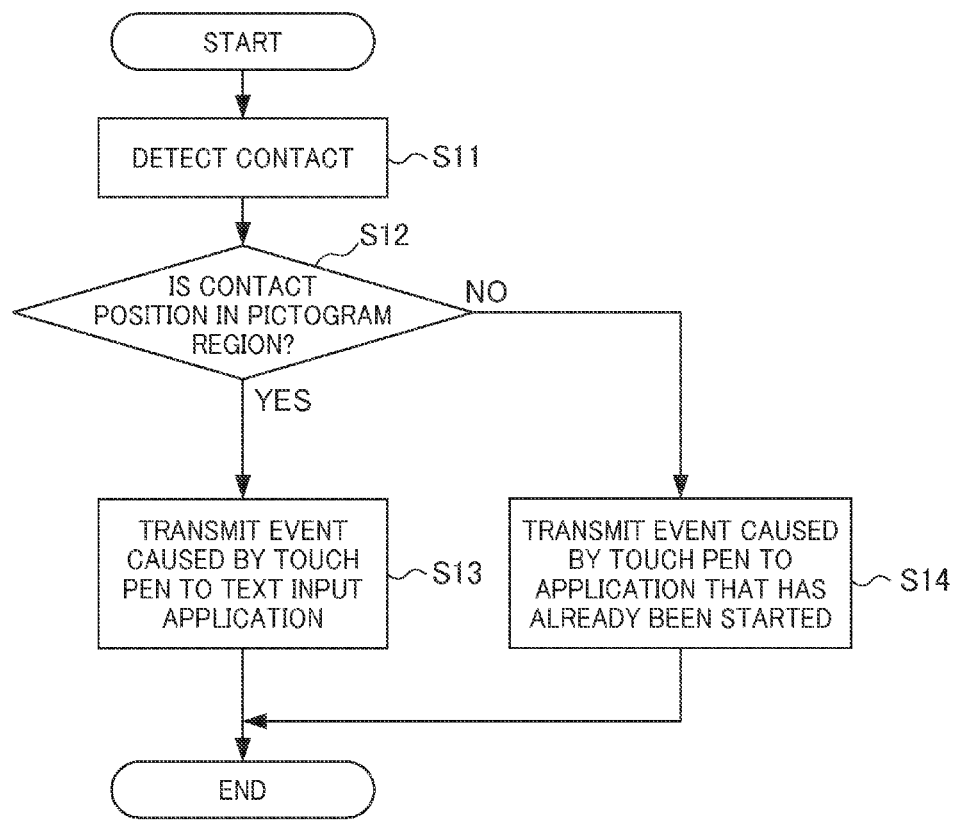
FIG. 8 is a flow chart showing processing for detecting contact to the touch panel with a touch pen by the detecting unit.
Figure 9:
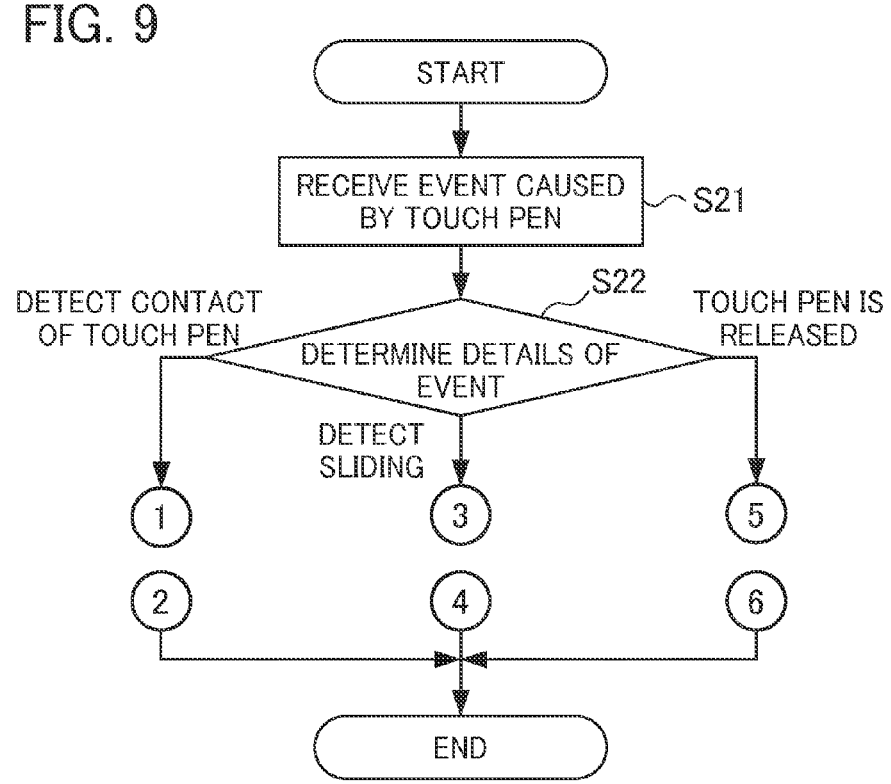
FIG. 9 is a flow chart showing processing by an application control unit.
Figure 10:
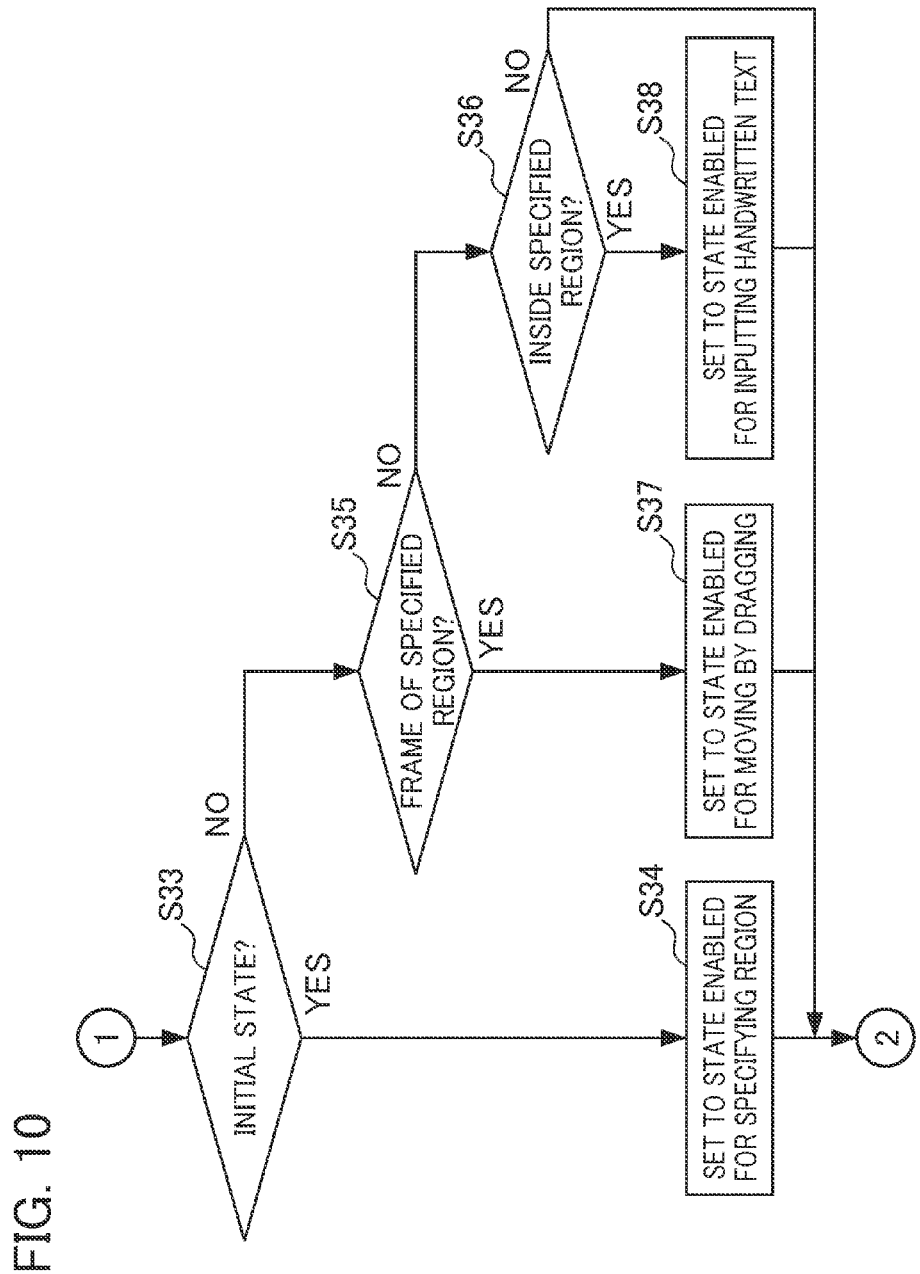
FIG. 10 is a flow chart showing processing by the application control unit.
Figure 11:
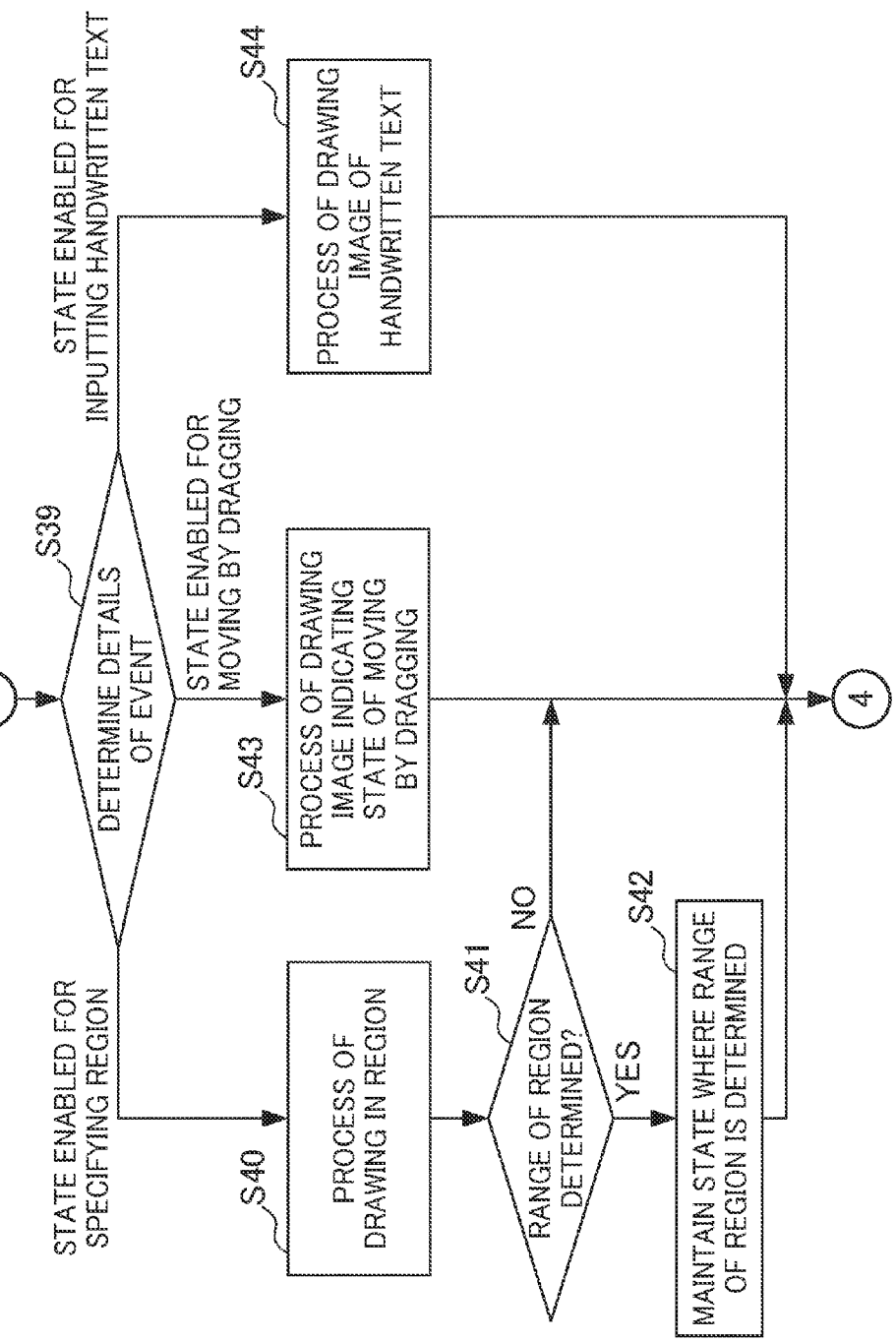
FIG. 11 is a flow chart showing processing by the application control unit.

FIG. 8 is a flow chart showing processing for detecting contact to the touch panel 10 using the touch pen 18 by the detecting unit 12. In Step S11, the application control unit 173 detects by the detecting unit 12 contact to the touch panel 10 using the touch pen 18. In Step S12, the application control unit 173 determines whether or not the contacted position displays the pictogram region P. If the contacted position is the position displaying the pictogram region P (YES), the process proceeds to Step S13. If the contacted position is not the position displaying the pictogram region P (NO), the process proceeds to Step S14.

In Step S13, the application control unit 173 transmits an event caused by the touch pen 18 to the application. In Step S14, the application control unit 173 transmits the event caused by the touch pen 18 to the application that has already been started.

FIGS. 9-12 are flow charts showing processing by the application control unit 173. In Step S21, the application control unit 173 receives the event caused by the touch pen 18 that has been transmitted in Step S13.

In Step S22, the application control unit 173 determines the details of the event caused by the touch pen 18. Specifically, the application control unit 173 determines which of a case where contact of the touch pen 18 is detected, a case where the touch pen 18 is moved on the touch panel 10 while the contact of the touch pen 18 is being detected, and a case where the touch pen 18 is released from the touch panel 10, is the event caused by the touch pen 18.

Figure 12:
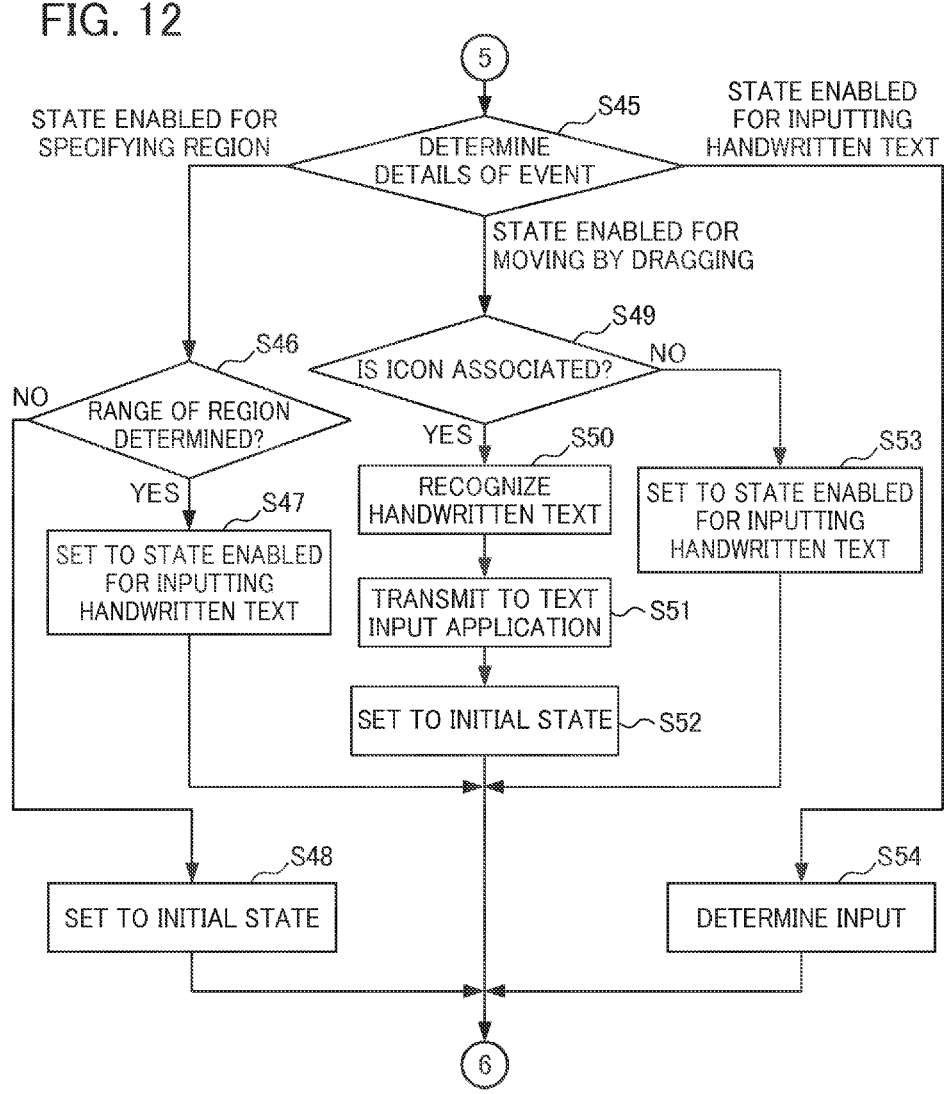
FIG. 12 is a flow chart showing processing by the application control unit.

Then, regarding the application control unit 173, when contact of the touch pen 18 is detected, the process proceeds to Step S23 (refer to FIG. 10), when the touch pen 18 is moved on the touch panel 10 while the contact of the touch pen 18 is detected (when sliding is detected), the process proceeds to Step S39 (refer to FIG. 11), and when the touch pen 18 is released from the touch panel 10, the process proceeds to Step S45 (refer to FIG. 12).

In Step S33, the application control unit 173 determines whether or not it is in a state where a region is not specified by the region specification unit 175, that is, whether or not the state of the region specification unit 175 is an initial state. If it is in the initial state (YES), the process proceeds to Step S34. When it is not in the initial state, the process proceeds to Step S35 (NO).

In Step S34, the application control unit 173 starts the handwritten text recognizing application, and sets the state to a state capable of specifying a region by the region specification unit 175. In Step S35, the application control unit 173 determines whether or not the contact of the touch pen 18 is a frame of the region specified by the region specification unit 175. If it is the frame of the region specified by the region specification unit 175 (YES), the process proceeds to Step S37. When it is not the frame of the region specified by the region specification unit 175 (NO) and is in the specified region (Step S36 (YES)), the process proceeds to Step S38.

In Step S37, the region specified by the region specification unit 175 and the handwritten text inside the region are set together in a state capable of being moved with a drag of the touch pen 18. In Step S38, the application control unit 173 sets the region specified by the region specification unit 175 to a state enabled for inputting the handwritten text by the handwritten text input unit 174.

In Step S39, the application control unit 173 determines the details of the event caused by the touch pen 18. Specifically, regarding the application control unit 173, when it is in a state capable of specifying a region by the region specification unit 175, the process proceeds to step S40, and when the region and the handwritten text inside the region are in a state capable of being moved by dragging the touch pen 18, the process proceeds to Step S43, and when it is in a state capable of inputting handwritten text by the handwritten text input unit 174 in the specified region, the process proceeds to Step S44.

In Step S40, the region specification unit 175 starts the handwritten text recognizing application and detects, by the detecting unit 12, the trajectory drawn on the display unit 11 using the touch pen 18. Then, the region specification unit 175 carries out drawing processing of the region surrounded by the detected trajectory and specifies the region as a region capable of inputting a handwritten text.

In Step S41, the application control unit 173 determines whether or not the range of the region specified by the region specification unit 175 is determined. If the range of the region is determined (YES), the process proceeds to Step S42. If the range of the region is not fixed (NO), the process ends.

In Step S42, the application control unit 173 maintains the state where the range of the region specified by the region specification unit 175 is determined. In Step S43, the application control unit 173 makes the handwritten text recognizing application perform drawing processing of an image indicating a state where the region specified by the region specification unit 175 and the handwritten text in the region move according to the drag of the touch pen 18.

In Step S44, the application control unit 173 carries out the drawing processing of the image of the handwritten text that is input by the handwritten text input unit 174 by the handwritten text recognizing application.

In Step S45, the application control unit 173 determines the details of the event caused by the touch pen 18. Specifically, if it is in a state where a region is specified by the region specification unit 175, the application control unit 173 makes the process proceed to Step S46; if it is in a state where the region and the handwritten text inside the region can be moved by dragging the touch pen 18, the application control unit 173 makes the process proceed to Step S49; and if it is in a state where the handwritten text can be input by the handwritten text input unit 174 in the specified region, the application control unit 173 makes the process proceed to Step S54.

In Step S46, the application control unit 173 determines whether or not the range of the region specified by the region specification unit 175 is determined. If the range of the region is determined (YES), the process proceeds to Step S47. If the range of the region is not fixed (NO), the process proceeds to Step S48.

In Step S47, the application control unit 173 sets the region specified by the region specification unit 175 to a state enabled for inputting the handwritten text by the handwritten text input unit 174. In Step S48, the application control unit 173 set a state where a region is not specified by the region specification unit 175, that is, the application control unit 173 sets the state of the region specification unit 175 to an initial state.

In Step S49, the region specified by the region specification unit 175 is dragged to one of the icons 19a-19f by operating the touch pen 18, and the application control unit 173 determines whether or not the icon 19a-19f is associated with an application. If the icon 19a-19f is associated with an application (YES), the process proceeds to Step S50. If the icon 19a-19f is not associated with an application (NO), the process proceeds to Step S53.

In Step S50, by the handwritten text recognizing application, the handwritten text input unit 174 performs pattern matching between the detected trajectory and the text stored in the handwritten text recognizing database, and converts the text with the highest recognition rate into text data.

In Step S51, the handwritten text input unit 174 transmits the text data that underwent the conversion to an application associated with one of the icons 19a-19f. In Step S52, the application control unit 173 set a state where a region is not specified by the region specification unit 175, that is, the application control unit 173 sets the state of the region specification unit 175 to an initial state.

In Step S53, the application control unit 173 sets the region specified by the region specification unit 175 to a state enabled for inputting the handwritten text by the handwritten text input unit 174. In Step S54, the handwritten text input unit 174 conclusively fixes the input of the trajectory drawn using the touch pen 18.

As described above, according to the second embodiment, the cellular telephone device 1 can input the selected text into an application by starting the application by an intuitive operation that uses icons (icons 19a-19f) displayed on the display unit 11.

Third Embodiment

Next, a third embodiment according to the electronic device of the present invention will be described. With respect to the third embodiment, points that differ from the first and second embodiments will mainly be described, identical reference numerals are assigned, and descriptions omitted for components that are the same as the first or second embodiment. Descriptions as in the first and second embodiments apply as appropriate for points that are not described in particular with respect to the third embodiment.

The cellular telephone device 1 according to the third embodiment is different from the second embodiment in that it selects text displayed on the display unit 11 after contact to the region, where an image (for example, an icon) displayed on the display unit 11 is displayed, is detected.

That is, when contact to the region, where an image (for example, an icon) displayed on the display unit 11 is displayed, is detected by the detecting unit 12 and text is selected by detecting contact to at least a part of the text displayed on the display unit 11 by the detecting unit 12, the application control unit 173 inputs the selected text by starting an application that is associated with an icon on which the contact is detected.

Figure 13:
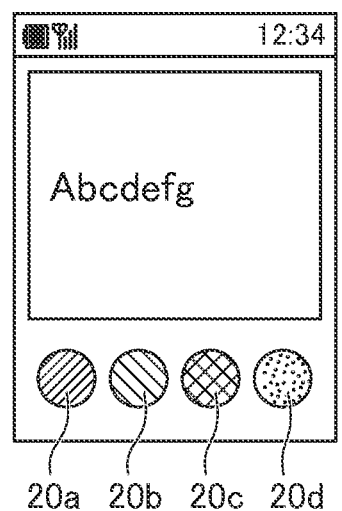
FIG. 13 is a diagram showing an example of the screen displayed on the display unit according to a third embodiment.
Figure 14:
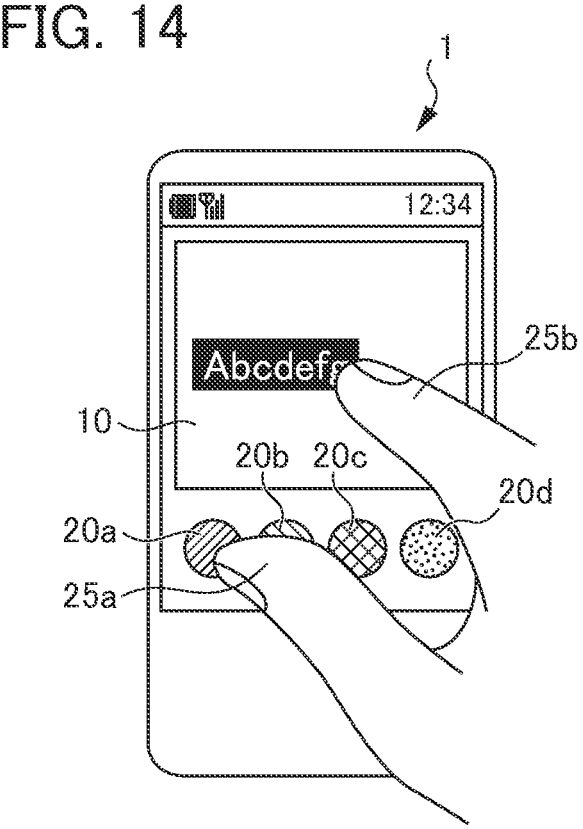
FIG. 14 is a diagram showing an example of the screen displayed on the display unit according to the third embodiment.

FIG. 13 and FIG. 14 are diagrams showing an example of the screen displayed on the display unit 11 according to the third embodiment. In FIG. 13, a browser application has been started and text "Abcdefg" is displayed on the display unit 11, and application starting icons 20a-20d that are associated with applications are displayed in the lower part of the display unit 11 by the application control unit 173.

Then, in the state shown in FIG. 13, text is selected by, for example, detecting, with the detecting unit 12, contact of the user's thumb 25a to the icon 20a, and detecting, with the detecting unit 12, contact of the user's index finger 25b to the text "Abcdefg" displayed on the display unit 11 (refer to FIG. 14).

Then, when the detection of the contact to the icon 20a is determined by the contact of the thumb 25a to the icon 20a being released, the application control unit 173 starts an application (for example, a memo pad application) associated with the icon 20a and inputs the selected text "Abcdefg" into the started application.

Thereby, as in the second embodiment, the cellular telephone device 1 according to the third embodiment can input the selected text into an application by starting the application by an intuitive operation using images (icons) displayed on the display unit 11. In particular, since the operation involves selecting the text targeted to be input by the index finger 25b while specifying the application targeted to be started with the thumb 25a, the operation is carried out smoothly from the index finger 25b to the thumb 25a, enabling the cellular telephone device 1 to start the application by an intuitive operation and input the selected text into the application.

In addition, since the cellular telephone device 1 starts an application stored by being associated with an icon 20a when the detection of the contact to the icon 20a is determined, it is possible to prevent erroneous operations as a result of the operation of selecting text.

Figure 15:
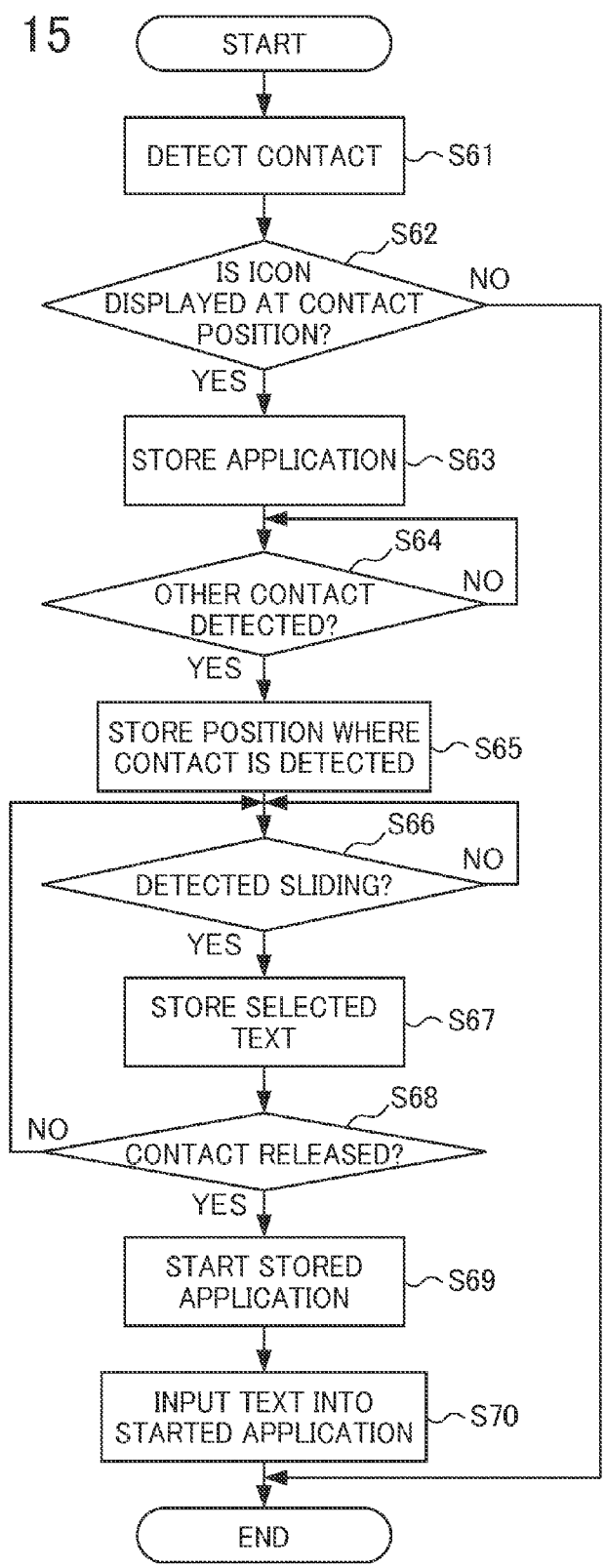
FIG. 15 is a flow chart showing processing by the application control unit according to the third embodiment.

FIG. 15 is a flow chart showing processing by the application control unit 173 according to the third embodiment. In Step S61, the application control unit 173 detects contact to the touch panel 10 by the detecting unit 12.

In Step S62, the application control unit 173 determines whether or not one of the application starting icons 20a-20d is displayed on the contacted position. If one of the icons 20a-20d is displayed (YES), the process proceeds to Step S63. If the icon 20a-20d is not displayed (NO), the process ends.

In Step S63, the application control unit 173 stores in the storage unit 16 an application associated with one of the icons 20a-20d displayed on a position where the contact is detected in Step S61.

In Step S64, the application control unit 173 determines whether or not another contact to the touch panel 10 is detected by the detecting unit 12 in a state where contact to the touch panel 10 is detected by the detecting unit 12. If another contact is detected by the detecting unit 12 (YES), the process proceeds to Step S65. If another contact is not detected by the detecting unit 12 (NO), processing in Step S64 is repeated again.

In Step S65, the application control unit 173 stores in the storage unit 16 a position where the contact is detected in Step S64.

In Step S66, the application control unit 173 determines whether or not movement of the contact position in a state where the contact is maintained, is detected by the detecting unit 12, that is, whether or not sliding is detected by the detecting unit 12 in a state where the contact is maintained. If sliding is detected by the detecting unit 12 (YES), the process proceeds to Step S67. If sliding is not detected by the detecting unit 12 (NO), processing in Step S66 is repeated again.

In Step S67, the application control unit 173 stores in the storage unit 16 information displayed on a position selected by the sliding, that is, text displayed at a position selected with the sliding.

In Step S68, the application control unit 173 determines whether or not the contact to one of the icons 20a-20d is released. If the contact to one of the icons 20a-20d is released (YES), the process proceeds to Step S69. If the contact to one of the icons 20a-20d is not released (NO), the process returns to Step S66.

In Step S69, when the contact to one of the icons 20a-20d is determined by the contact to one of the icons 20a-20d being released, the application control unit 173 starts an application stored as being associated with one of the icons 20a-20d.

In Step S70, the application control unit 173 inputs the text stored in Step S67 into the started application.

As described above, according to the third embodiment, the cellular telephone device 1 can input the selected text into an application by starting the application by an intuitive operation using images displayed on the display unit 11.

In addition, although the handwritten text input unit 174 detects a trajectory (text or image) drawn by the handwritten text input unit 174 using the touch pen 18 after specifying a region by the region specification unit 175 in the embodiment described above, the region may be stored by the region specification unit 175 after detecting the trajectory (the text or the image) drawn by the handwritten text input unit 174 using the touch pen 18.

In addition, although an example where a browser application has been started and an image F11 is displayed on the display unit 11 in the embodiment described above, the present invention is applicable even for a state where another application is started, and furthermore, the present invention is applicable even for a state where a standby screen is displayed. In addition, embodiments that combine suitably the above-described first, second, and third embodiments are also possible.

Embodiments of the present invention have been described above, but the present invention is not limited to the embodiments described above and can be modified as appropriate. In addition, in the embodiments described above the cellular telephone device 1 is described as a digital camera, but a PHS (registered trademark: Personal Handy phone System), a PDA (Personal Digital Assistant), a portable navigation device, a personal computer, a notebook PC, or a portable gaming device are also possible.

EXPLANATION OF REFERENCE NUMERALS 1 cellular telephone device (electronic device)
11 display unit
12 detecting unit
17 control unit
171 starting unit
172 application control unit

What is claimed is:

1. An electronic device comprising:
a display unit;
a detecting unit which detects contact to the display unit;
a starting unit which starts an application;
a control unit which, in a state where text is displayed on the display unit, displays on the display unit an application starting display associated with an application, in a case where text is selected by the detecting unit detecting contact to a region where the text is displayed, wherein in a state where text is displayed on the display unit, in a case where text is selected by the detecting unit detecting contact to a region where the text is displayed, the control unit displays on the display unit an icon associated with the application as the application starting display, and in a case where contact to a region, where the icon is displayed, is detected by the detecting unit, causes the starting unit to start an application associated with an icon on which the contact is detected and inputs the selected text into a text input region of the application.

2. The electronic device according to claim 1, wherein when the application starting display is selected, in a state where the application starting display is displayed on the display unit, the control unit causes the starting unit to start an application associated with the selected application starting display and the selected text to be input into a text input region of the application.

3. The electronic device according to claim 2, wherein the control unit displays on the display unit a plurality of application starting displays associated with a plurality of applications, and causes the starting unit to start an application associated with a application starting display selected from among the plurality of application starting displays starts.

4. The electronic device according to claim 1, wherein in a state where an image is displayed on the display unit, in a case where the image is selected by the detecting unit detecting contact to a region where the image is displayed, the control unit displays on the display unit the application starting display associated with an application.

5. The electronic device according to claim 4, wherein in a state where the application starting display is displayed on the display unit, when the application starting display is selected, the control unit starts an application associated with the selected application starting display and inserts the selected image into an image insertion region of the application.

6. The electronic device according to claim 4, wherein the control unit displays the application starting display on the display unit in a case where contact to the region where the text or the image is continuously displayed for more than or equal to predetermined time, is detected by the detecting unit.

7. The electronic device according to claim 4, wherein the control unit displays on the display unit an application starting display that is different depending on the selected text or image.

8. The electronic device according to claim 1, wherein in a state where an image is displayed on the display unit, in a case where an image is selected by the detecting unit detecting contact to a region where an image is displayed, the control unit causes the starting unit to start an application associated with an icon on which the contact is detected, and inserts the selected text into an image insertion region of the application.

9. The electronic device according to claim 8, wherein when detection by the detecting unit of contact to the region where an icon is displayed is determined, the control unit starts an application associated with the icon on which the contact is detected.

10. The electronic device according to claim 1, further comprising a handwritten text input unit which inputs handwritten text by contact to the display unit, and wherein the text displayed on the display unit is text that is input by the handwritten text input unit.

11. The electronic device according to claim 10, further comprising a region specification unit which specifies a region for inputting the handwritten text on the display unit by contact to the display unit, and wherein the handwritten text input unit inputs handwritten text inside the region specified by the region specification unit.

12. The electronic device according to claim 1, wherein in a case where the started application is ended, the control unit displays on the display unit text that was displayed immediately before the detecting unit detected contact to the region where the text is displayed.

13. A method for controlling an electronic device comprising:
- a step of displaying text on a display unit;
- a step of selecting text by a detecting unit detecting contact to the display unit; and
- a step of displaying on the display unit an application starting display which is used for starting an application by a starting unit in response to the text being selected, wherein in a state where text is displayed on the display unit, in a case where text is selected by the detecting unit detecting contact to a region where the text is displayed, displaying on the display unit an icon associated with the application as the application starting display, and in a case where contact to a region, where the icon is displayed, is detected by the detecting unit, starting an application associated with an icon on which the contact is detected and inputting the selected text into a text input region of the application.

* * * * *